(12) United States Patent
Burnett

(10) Patent No.: US 8,582,942 B1
(45) Date of Patent: Nov. 12, 2013

(54) COMPRESSION RESISTANT AND THERMAL EXPANSION COMPENSATED FIBER OPTIC CABLE

(75) Inventor: Julie Anne Burnett, Acworth, GA (US)

(73) Assignee: Superior Essex Communications LP, Atlanta, GA (US)

( * ) Notice: Subject to any disclaimer, the term of this patent is extended or adjusted under 35 U.S.C. 154(b) by 310 days.

(21) Appl. No.: 12/932,025

(22) Filed: Feb. 16, 2011

Related U.S. Application Data

(60) Provisional application No. 61/338,199, filed on Feb. 16, 2010.

(51) Int. Cl.
*G02B 6/44* (2006.01)

(52) U.S. Cl.
USPC ........... 385/113; 385/102; 385/103; 385/104; 385/109; 385/114

(58) Field of Classification Search
USPC .......... 385/100, 102, 103, 104, 109, 113, 114
See application file for complete search history.

(56) References Cited

U.S. PATENT DOCUMENTS

| | | | | |
|---|---|---|---|---|
| 2,998,472 A | * | 8/1961 | Bondon | 174/28 |
| 4,515,435 A | * | 5/1985 | Anderson | 385/103 |
| 5,539,849 A | * | 7/1996 | Petisce | 385/102 |

* cited by examiner

*Primary Examiner* — Jennifer Doan

(57) ABSTRACT

A fiber optic cable can comprise technology for mitigating stress on optical fibers of the cable. The technology can protect the optical fibers from compression, such as stemming from installation, deployment, or handling. The technology can compensate for thermally induced expansion and contraction of cable elements having differing thermal expansion characteristics, arising when the cable is subjected to temperature variations. The cable can comprise a central strength member onto which an elastomeric material, such as silicone, has been applied. The elastomeric material can protect optical fibers that are located between the central strength member and an outside jacket.

19 Claims, 2 Drawing Sheets

COMPRESSION RESISTANT AND THERMAL EXPANSION COMPENSATED FIBER OPTIC CABLE

CROSS REFERENCE TO RELATED APPLICATIONS

This patent application claims priority under 35 U.S.C. §119 to U.S. Provisional Patent Application No. 61/338,199, entitled "Compression Resistant and Thermal Expansion Compensated Fiber Optic Cable" and filed Feb. 16, 2010, the entire contents of which are hereby incorporated herein by reference.

TECHNICAL FIELD

The present invention relates generally to fiber optic communication cables and more specifically to a fiber optic cable that is configured for compression resistance and thermal compensation and that may comprise elastomeric material associated with a strength member.

BACKGROUND

Fiber optic cables include one or more optical fibers or other optical waveguides that carry light, such as optical signals carrying voice, data, video, or other information. As compared to electrical conductors, most optical fibers are relatively delicate; many are made of glassy materials. Stressing an optical fiber to a critical level can lead to catastrophic failure, such as breakage. However, much lower levels of stress can interfere with light transmission. For example, lateral compression on an optical fiber can cause light to leak out of the core of the optical fiber, thereby attenuating intensity of transmitting optical pulses that convey information.

During and following installation, fiber optic cables are often subjected to diverse stresses, such as associated with being snaked through tight, convoluted paths, bent around sharp corners, pulled through conduit, and squeezed by heavy objects. Temperature fluctuations in the operating environment of the cable pose another source of stress. The various elements in the fiber optic cable typically expand and contract at different rates when temperature of the cable changes. For example, stress can occur as a result of shortening and lengthening of cable elements between winter and summer or day and night conditions or as a result of subjecting one section of the cable to heat and another section to cold.

While conventional fiber optic cables often include stress management elements, the optical fibers of such cables can still experience detrimental levels of stress if handled or deployed inappropriately. Many conventional cables are constructed utilizing engineering tradeoffs in which sensitivity to one type of stress is reduced at the expense of increasing sensitivity to another type of stress. For example, conventional approaches to increasing pull strength can introduce problematic thermal expansion and contraction stresses.

Accordingly, improved fiber optic cabling technology is needed to address such representative deficiencies in the art. Need is apparent for a fiber optic cable that can protect optical fibers. Need exists for a fiber optic cable that resists compression, such as due to laterally applied force. Need further exists for a fiber optic cable that compensates for thermal expansion. A capability addressing one or more of the aforementioned needs, or some related deficiency in the art, would promote robust fiber optic installments and would promote optical fibers for communications and other applications.

SUMMARY

The present invention supports mitigating stress on optical fibers due to thermally induced expansion and contraction of cable elements and/or due to compression associated with installation, deployment, or handling.

In one aspect of the present invention, a fiber optic cable comprises a strength member running down a core of the fiber optic cable. Optical fibers can be positioned in a pattern around the strength member. An elastomeric material can be positioned between the optical fibers and the strength member. A jacket can form an outer, protective covering of the cable.

The discussion of protecting optical fibers presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, processes, and objects of the present invention will become apparent to one with skill in the art upon examination of the following drawings and detailed description. It is intended that all such aspects, systems, methods, features, advantages, processes, and objects are to be included within this description, are to be within the scope of the present invention, and are to be protected by the accompanying claims.

Figure 1:
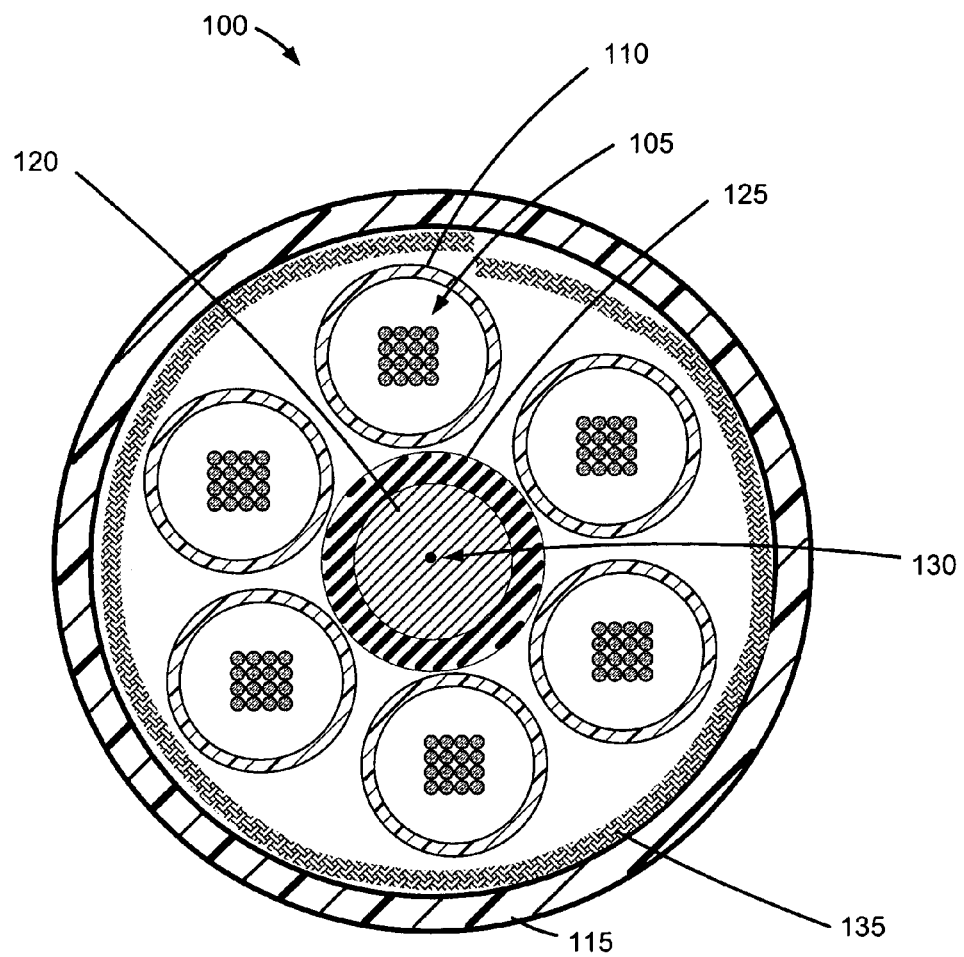
FIG. 1 is a cross sectional view of an exemplary fiber optic cable in accordance with certain embodiments of the present invention.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements across the illustrations.

DETAILED DESCRIPTION OF EXEMPLARY EMBODIMENTS

A fiber optic cable can protect optical fibers from compression, such as stemming from installation, deployment, or handling. The cable can compensate for thermally induced expansion and contraction of cable elements having differing thermal expansion characteristics. The cable can comprise a central strength member that resists tensile loads. An elastomeric material can extend alongside the central strength member. The elastomeric material can protect optical fibers that are located between central strength member and a jacket.

Technology for protecting an optical fiber will now be discussed more fully hereinafter with reference to the figures, which describe representative embodiments of the present invention. The exemplary embodiment of FIG. 1 comprises loose buffer tubes or subunits, each carrying a respective bundle of optical fibers. The exemplary embodiment of FIG. 2 comprises tight buffered optical fibers.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to FIG. 1, this figure illustrates, in cross sectional view, a fiber optic cable 100 according to certain exemplary embodiments of the present invention. As will be discussed in further detail below, the illustrated fiber optic cable 100 comprises a jacket 115, a central strength member 120 extending along an axis 130 of the cable, an elastomeric material 125, and buffer tubes 140 carrying bundles of optical fibers 105.

The jacket 115 of the exemplary fiber optic cable 100 extends lengthwise, providing an outer, cylindrical surface for the cable 100. The jacket 115 provides environmental protection as well as strength and structural support. In various embodiments, the jacket 115 can be characterized as an outer sheath, an outer jacket, sheathing, a skin, a casing, or a shell.

The jacket can form or define a core within the fiber optic cable 100 that can comprise a longitudinal cavity, a hollow space, or a cylindrical volume. In other words, the jacket 115 can enclose a volume that contains various other elements, features, structures, or components of the fiber optic cable, with the jacket 115 typically being open at the cable ends (prior to termination), and therefore exposing the core, at each unterminated end of the fiber optic cable 100.

The jacket 115 typically comprises pliable or flexible material such as plastic or polymer. In certain embodiments, the jacket 115 can have a polymeric composition that includes fluorine, for example a fluoropolymer such as FEP, TFE, PTFE, PFA, etc. Alternatively, the jacket 115 can comprise olefin, polyester, silicone, polypropylene ("PP"), polyethylene ("PE"), medium density polyethylene ("MDPE"), high density polyethylene ("HDPE"), polymide, polyvinyl chloride ("PVC"), or some other polymer or other material that provides acceptable strength, fire resistance, or abrasion and chemical properties as may be useful for various applications. In certain exemplary embodiments, the jacket 115 comprises flame retardant PVC or another appropriate flame retardant material, to facilitate a fire resistant rating.

In certain embodiments, the jacket 115 can be extruded or pultruded using plastic, rubber, PVC, polymer, polyolefin, flame retardant polyolefin, PE, modified ethylene-CTFE (under the trademark VATAR), PVDF copolymer or homopolymer, acrylic, polyamide (nylon), silicone, urethane, EVA, a halogen-free polymer, or another appropriate material, for example.

In certain embodiments, the jacket 115 comprises (or consists of) black MDPE. The black covering can enhance environmental protection, for example via avoiding damage from ultraviolet sunlight. In certain exemplary embodiments, the jacket 115 comprises PVC, for example utilizing polymer stock supplied by Alphagary Corporation of Leominister, Mass.; Teknor Apex Company of Pawtucket, R.I.; or Polyone Corporation of Avon Lake, Ohio.

In certain embodiment, the jacket 115 circumferentially covers a corrugated metal armor (not illustrated) that offers supplemental mechanical protection, including crush resistance. Such metal armor can further be useful for rodent protection.

The strength member 120 of the illustrated fiber optic cable 100 runs lengthwise, substantially along the axis 130 of the cable 100 and structurally supports the cable 100. In the illustrated embodiment, the strength member 120 comprises steel or another metal. In certain other embodiments, the strength member 120 comprises glass reinforced plastic ("GRP"), such as in a rod format. Accordingly, the strength member 120 can include, hard materials. In certain exemplary embodiments, the strength member 120 can comprise aramid filaments or cord, which may be impregnated with a resin that is hardened or cured after impregnation. Although the illustrated embodiment has exactly one strength member 120, other cable embodiments may comprise two or more strength members 120, which may or may not be centrally located.

In the illustrated embodiment, the axis 130 of the fiber optic cable 110 lies within the strength member 120. In other exemplary embodiments, the strength member 120 may be next to the axis 130. In various embodiments, the strength member 120 and the axis 130 may be coaxial, collinear, parallel, substantially parallel, separated, or helically arranged, to mention a few representative possibilities.

The illustrated strength member 120 provides rigidity and crush resistance to facilitate rough handling as may be encountered in underground applications. Additionally, the strength member 120 takes tensile loading, such as when aggressively pulling the fiber optic cable 100 through a conduit or in connection with underground applications. In certain exemplary embodiments, the strength member 120 can have an outer diameter in a range of about one millimeter (mm) to about five mm, for example.

As will be discussed in further detail below, a elastomeric material 125 that is applied to the strength member 120 protects the cable elements that are situated between the strength member 120 and the jacket 115. In the illustrated fiber optic cable 100 such protected elements include six buffer tubes 110 arranged around the strength member 120 in a ring pattern. Six being an exemplary, rather than limiting, number. Various embodiments of the fiber optic cable can have fewer or more buffer tubes and may include multiple concentric rings of buffer tubes 110, for example. Accordingly, in certain exemplary embodiments, two or more buffer tubes 110 encircle the strength member 120. Such buffer tubes 110 may be stranded or twisted around the strength member 120 or may be untwisted. In certain exemplary embodiments, air or another gas is disposed in interstitial spaces among the buffer tubes 110.

The term "buffer tube," as used herein, generally refers to a tube for containing one or more optical fibers and for providing such optical fibers annular space for lateral movement. When a fiber optic cable is bent, optical fibers in a buffer tube of the cable may move towards one side of the buffer tube, for example. Accordingly, usage of the term "buffer tube" is intended and believed to be consistent with current industry usage, rather than invoking some meaning that is unique to this disclosure.

In certain exemplary embodiments, the buffer tubes 110 comprise PP, PE, copolymers of PP and PE, nucleated copolymers of polypropylene and polyethylene ("n-PP"), polybutylene terephthalate ("PBT"), polyamides such as nylon 12, polycarbonate ("PC"), fluoropolymers, or multiple layers of these materials, such as a dual-wall tube using PBT and PC ("PBT/PC").

In certain exemplary embodiments, the buffer tubes 110 comprise a polymer mixture and an agent for promoting compatibility of the polymers in the mixture. For example, a first component of such a mixture can comprise PBT, PET, or PC, while a second component comprises EMA, EBA, EVA, or EMAAA.

In certain exemplary embodiments, the buffer tubes 110 are made in accordance with the teaching of U.S. Pat. No. 7,346,257, entitled "Buffer Tubes with Improved Flexibility." The entire contents of U.S. Pat. No. 7,346,257 are hereby incorporated herein by reference.

Each of the buffer tubes 110 carries a respective bundle of optical fibers 105. In the illustrated embodiment, each bundle of optical fibers 105 has sixteen optical fibers 105, four rows with four fibers 105 per row. More generally, the optical fibers 105 can form a bundle of loose optical fibers 105 or a bundle with ribbons of the optical fibers 105 adhering to one another to form a single unit. A twist in the bundle of optical fibers 105 along the length of the fiber optic cable 100 captures a ribbon stack into a single unit and helps distribute bending stresses among individual optical fibers 105. That is, a stack of ribbons of optical fibers 105 exhibits a lay or a periodic rotation about its central axis. The bundle of optical fibers 105 typically has substantial freedom of motion within the buffer tube 110, for example with the inner diameter of the buffer tube 110 larger than the diagonal of the bundle's cross section.

Accordingly, in certain exemplary embodiments, the optical fibers 105 are organized in linear arrays or "ribbons" of optical fibers 105, with arrays stacked on top of one another. For example, each ribbon may include 4, 12, 24, or more optical fibers 105, with the ribbon stacked to achieve the desired fiber capacity. Alternatively, the optical fibers 105 may be arranged as an unorganized bundle of loose fibers, rather than a stack of ribbons.

The illustrated number of optical fibers 105 and the illustrated configuration are intended to be exemplary rather than limiting. Each optical fiber 105 could be a single mode fiber or some other optical waveguide that carries data optically 10 or 40 Giga bits per second ("Gbps") or some other appropriate data rate, for example. In various exemplary embodiments, the optical fibers 105 can be single mode, or multimode and can have a composition based on glass, glassy, or silica material. Alternatively, the optical fibers 105 can incorporate plastic material as an optical transmission medium.

In certain exemplary embodiments, the optical fibers 105 are "bend insensitive" or "bend tolerant" single-mode optical fibers that can withstand and operate under substantial bending stress. In one exemplary embodiment, the optical fibers 105 transmit optical signals having a wavelength between about 800 nanometers and 1625 nanometers. Other embodiments may transmit optical signals in other wavelength regions. Suitable sources for the optical fibers 105 include the fiber optic product marketed by OFS/Furukawa Electric North America (Norcross, Ga.) under the trade identifier ALLWAVE FLEX and the fiber optic product marketed by Draka Cableteq under the trade identifier BENDBRIGHTXS.

The term "optical fiber," as used herein, generally refers to a slender filament of material that guides light for transmission along a longitudinal axis. The slender filament of material may comprise glass, plastic, and/or some other appropriately transparent material.

In certain exemplary embodiments, the buffer tubes 110 can be filled with a fluid or gel that further protects the optical fibers 105. Alternatively (and as illustrated in FIG. 1), a gas, such as air, can be disposed inside the buffer tubes 110 so that the air contacts the optical fibers 105. Thus, the optical fibers 105 can be characterized as "dry" with respect to the environment inside the buffer tubes 110. The term "dry," as used herein in the context of characterizing a fiber optic cable or a buffer tube or other region within a cable, generally indicates that the fiber optic cable or buffer tube or other region is free of any fluids, greases, or gels for blocking water incursion.

In certain exemplary embodiments, the buffer tubes 110 contain a water-blocking material (not illustrated) that swells upon contact with water to prevent or to control water-based damage to the optical fibers 105. In one exemplary embodiment, such a water-blocking material comprises one, two, three, or four aramid yarns treated with super absorbent polymer material. The water-blocking can comprise yarns marketed by Teijin Aramid under the trade identifier TWARON, and specifically the product that company markets under the product identifiers 1052, D3052, and 2200. In certain exemplary embodiments, each buffer tube 110 houses a water-blocking thread, such as the product marketed by Fiber-Line, Inc. of Hatfield, Pa. under the product identifier "FL-P250." In certain exemplary embodiments, carrier tape is impregnated with water blocking Super Absorbent Polymers ("SAP's"). Such carrier tape may be positioned inside the buffer tubes 150, for example with the SAP directed away from the optical fibers 105 and/or towards the buffer tube 150. In certain exemplary embodiments, SAP may contact the buffer tube 110. Accordingly, various water-blocking threads, yarns, and materials can be inserted in the buffer tubes 110 to accompany and protect the optical fibers 105.

In the illustrated embodiment of FIG. 1, dry water blocking technology is incorporated in an annular space between the buffer tubes 110 and the jacket 115. More specifically, a water blocking tape 135 comprising SAP material, as discussed above, extends lengthwise and wraps around the buffer tubes 110. The water blocking tape suppresses longitudinal flow of any water that may enter the fiber optic cable 100 due to a breach of the jacket 115 and subsequent water incursion. In certain exemplary embodiments, the fiber optic cable 100 can comprise one or more of the other water blocking technologies disclosed above in addition to the water blocking tape 135 or in place of that tape 135. In certain exemplary embodiments, aramid strength yarns or fibers are included adjacent the water blocking tape 135 or in place of that tape 135.

The fiber optic cable 100 of FIG. 1 comprises an elastomeric material 125 disposed between the buffer tubes 110 and the strength member 120. In the illustrated embodiment, the elastomeric material 125 circumferentially covers and adheres to the strength member 120. In an exemplary embodiment, the elastomeric material 125 guards against signal attenuation due to applied compressive force (for example resulting from lateral squeezing of the fiber optic cable 100) and/or stress associated with thermal expansion or contraction due to temperature change. The elastomeric material 125 can address and/or mitigate environmental forces such as tensile loading associated with wind and ice loading, creep, Aeolian vibration, galloping, and so forth. Additionally, in certain embodiments, the elastomeric material 125 can enhance friction between the strength member 120 and adjacent cable components, which are the buffer tubes 110 in the illustration of FIG. 1.

In one exemplary embodiment, the outer diameter of the elastomeric material 125 is approximately the same diameter as the buffer tubes 110, thus facilitating a "six-around-one" configuration. In one exemplary embodiment, the outer diameter of the elastomeric material 125 is within about five percent, or about ten percent, of the diameter of each of the buffer tubes 110.

In certain exemplary embodiments, the elastomeric material 125 has a thickness that is at least about 20 percent or 30 percent or 40 percent of the radius of the strength member 120. In this context, thickness of the elastomeric material 125 for a particular cable section would be the distance between the outermost surface of the strength member 120 and the outermost surface of the elastomeric material 125 in a cross sectional view of the cable section. In certain exemplary embodiments that thickness of the elastomeric material 125 can be in a range between about ten and about fifty percent of the diameter of the strength member 120. In certain exemplary embodiments, the outer diameter of the elastomeric material 125 can be at least about 1.10 or about 1.25 times the outer diameter of the strength member 120. All values in this paragraph are exemplary and are not limiting. Other dimensions and values (e.g. tighter or looser ranges and/or bigger or smaller numbers) will find utility in various applications.

In certain exemplary embodiments, the elastomeric material 125 has a Shore A hardness of between about 30 and about 75. In certain exemplary embodiments, the elastomeric material 125 has a Shore A hardness of between about 25 and about 50. In certain exemplary embodiments, the elastomeric material 125 has a Shore A hardness of between about 45 and about 75.

Figure 2:
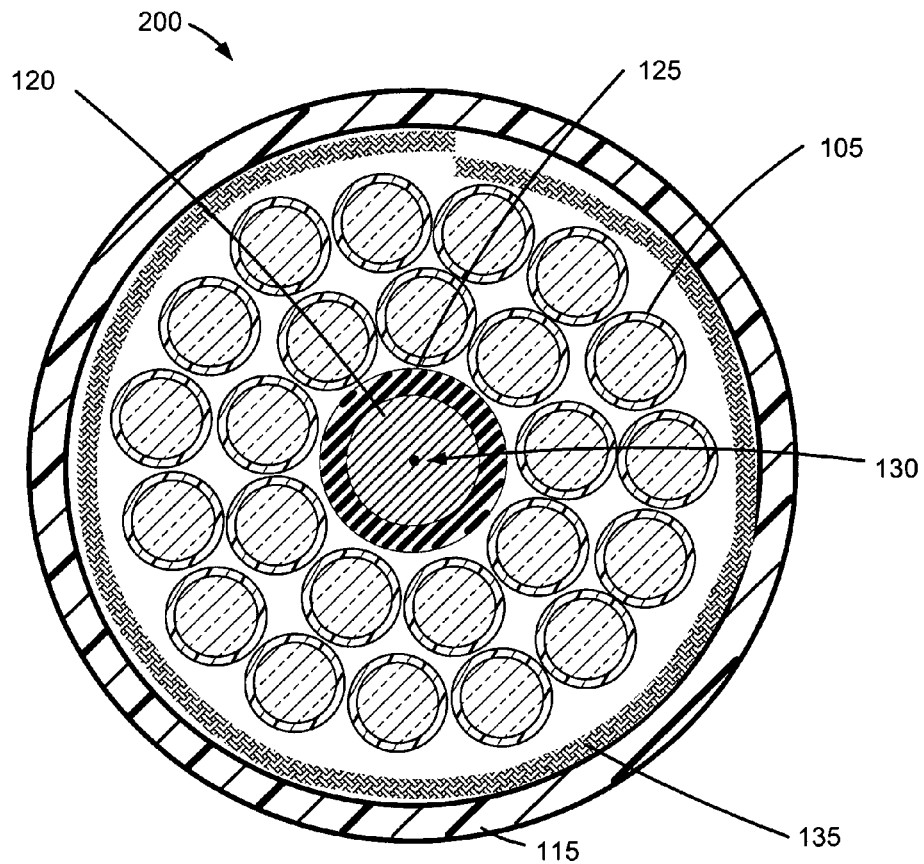
FIG. 2 is a cross sectional view of an exemplary fiber optic cable in accordance with certain embodiments of the present invention.

In certain exemplary embodiments, a static coefficient of friction in a range between about 0.9 and about 1.5 exists between the elastomeric material 125 and the adjoining component of the fiber optic cable 100 that is opposite the strength member 120. Thus, in the embodiment of FIG. 1, the interface between a buffer tube 105 and the elastomeric material 125 can have a static coefficient of friction between about 0.9 and about 1.5. In the embodiment of FIG. 2 (discussed below) the interface having such friction properties would be between the elastomeric material 125 and an optical fiber 105 that is tight buffered. In certain exemplary embodiments, the static coefficient of friction is substantially greater than one. In certain exemplary embodiment, the static coefficient of friction is between about 1 and about 1.25. Various other embodiments may have different friction properties as may be useful for various cable applications.

In certain exemplary embodiments, the elastomeric material 125 is an extrudable thermoplastic elastomer or silicone rubber that is extruded around the strength member 120. Accordingly, the elastomeric material 125 can be applied using up jacketed or over-jacketing process.

The term "elastomer," as used herein, generally refers to any rubbery material comprising long, chainlike molecules that are capable of recovering their original shape after being stretched to great extents. The long molecules of an elastomeric material are typically irregularly coiled under normal conditions but straighten in the direction of an applied force. The molecules spontaneously return to their normal coil orientations when the force is released.

In premise applications, the elastomeric material 125 typically exhibits sufficient flame retardancy to support passage of pertinent standard burn requirements, such as general, riser, plenum, or low-smoke zero-halogen specifications.

In one exemplary embodiment, the elastomeric material 125 comprises a flame retardant thermoplastic polyolefin elastomer ("TEO"), such as the material supplied by RTP Co. of Winona, Minn. under the trade identifier "RTP 2899 X 121316 A," with a Shore A hardness of 45. This material can be extruded over a fiber reinforced rod to form an embodiment in which the strength member 120 and the elastomeric material 125 are bonded together, with the elastomeric material 125 encapsulating the strength member 120.

In certain exemplary embodiments, the elastomeric material 125 comprises a helically oriented mesh, a lattice, a net, or netting that is wrapped or otherwise placed over or around or is disposed next to the strength member 120. The term "lattice" as used herein, generally refers to a structure that comprises crossed elongated elements that form a pattern of open spaces.

In certain exemplary embodiments, the elastomeric material 125 is formed from filaments, such as via coating a yarn in silicone. The resulting silicon-coated yarn can be paid-off from a spool and wrapped around the strength member 120 in helical form, to leave some openings on the strength member 120. Such yarn can be wrapped back and forth.

In one exemplary embodiment, the elastomeric material 125 comprises two yarns coated with an elastomer. One yarn wraps helically around the strength member 120 in a clockwise direction. Another yarn wraps helically around the strength member 120 in a counterclockwise direction. The opposing helical wrappings may thus form openings, cavities, or pockets within the elastomeric material 125 that may be filled with a gas such as air or with other appropriate material.

In one exemplary embodiment, the elastomeric material 125 is supplied as a sheet or tape that is wrapped around the strength member 120 during cable manufacturing. In certain embodiments, such a wrapped tape or sheet is affixed to the strength member 120 via adhesive, heat, bonding material, or another known approach. Alternatively, such a tape or sheet may be held in position through friction.

In one exemplary embodiment, the strength member 120 is radially flocked with a cut or milled flock of synthetic or non-synthetic material that effectively cushions surface hardness of the strength member 120 and/or increases coefficient of friction.

In one exemplary embodiment, the strength member 120 is coated with an adhesive. Ground rubber or synthetic rubber is blown onto the strength member 120 and the adhesive, causing the resulting elastomeric material 125 to adhere to the strength member 120. Water-swellable filaments or power can be mixed with the ground materials to provide elevated water protection.

Turning now to FIG. 2, this figure illustrates, in cross sectional view, a fiber optic cable 200 according to certain exemplary embodiments of the present invention. The embodiment of FIG. 2 is conducive to premise cable applications. For example, embodiments of the fiber optic cable 200 can be plenum-rated, riser-rated, or considered as premise cables. Further, embodiments of the fiber optic cable 200 can be flame resistant, fire resistant, or fire retardant, so as to comply with applicable building and fire safety codes, for example.

The fiber optic cable 200 comprises a strength member 120, as discussed above with reference to FIG. 1. The illustrated strength member 120 follows the axis 130 of the fiber optic cable 200. Elastomeric material 125 is disposed on or against the outer cylindrical surface of the strength member 120, providing cushioning and other protective attributes, as discussed above. Further, the elastomeric material 125 can provide controlled friction properties, for example supporting elevated friction when desired.

In the illustrated embodiment, the fiber optic cable 200 comprise two rings of optical fibers 105 circumferentially surround the strength member 120 and the adjoining elastomeric material 125. The optical fibers can traverse helical paths on the cable length, for example. As illustrated, air or another gas is disposed in interstitial spaces among the optical fibers 105.

In the illustrated embodiment of FIG. 2, each optical fiber 105 is tight buffered. The outer diameter of each optical fiber 105 can be about 600 microns or about 900 microns, wherein a glass diameter of about 125 microns is surrounded by tight buffering material. Suitable tight buffered optical fibers are available from OFS/Furukawa Electric North America (Norcross, Ga.). In certain exemplary embodiments, the outer diameter of the elastomeric material 125 is in a range between about 1.5 to about 5 times the outer, tight-buffer diameter of one of the optical fibers 105.

Water blocking tape 135 is disposed around the optical fibers 105. As discussed above with reference to FIG. 1, water blocking yarns, threads, or powders and/or strength yarns or filaments can be used with or substituted for the water blocking tape 135. The jacket 115 forms an outer surface of the fiber optic cable 200, providing environment protection and strength as discussed above.

From the foregoing, it will be appreciated that an embodiment of the present invention overcomes the limitations of the prior art. Those skilled in the art will appreciate that the present invention is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

What is claimed is:

1. A fiber optic cable comprising:
   a strength member extending lengthwise along a longitudinal axis of the fiber optic cable;
   a layer of elastomeric material adhering to and circumferentially surrounding the strength member, the elastomeric material comprising gas filled cavities dispersed lengthwise along the cable;
   a plurality of optical fibers disposed circumferentially about the strength member; and
   an outer jacket circumferentially covering the plurality of optical fibers, the layer of elastomeric material and the strength member.

2. The fiber optic cable of claim 1, wherein the layer of elastomeric material encapsulates the strength member.

3. The fiber optic cable of claim 1, wherein the layer of elastomeric material is bonded to the strength member.

4. The fiber optic cable of claim 1, wherein the elastomeric material comprises one of (i) a net, (ii) a lattice, or iii) a mesh of elastomeric material.

5. The fiber optic cable of claim 1,
   wherein the plurality of optical fibers comprises at least two rings of tight buffered optical fibers circumferentially disposed about the strength member.

6. The fiber optic material of claim 1, wherein the elastomeric material comprises at least one yarn coated with an elastomer.

7. The fiber optic material of claim 1, wherein the strength member has a radius, and
   wherein the elastomeric material has a thickness that is at least approximately 30 percent of the radius.

8. A fiber optic cable comprising:
   a strength member extending lengthwise;
   an elastomeric layer circumferentially surrounding the strength member, the elastomeric layer comprising a yarn coated in an elastomeric material wrapped around the strength member;
   a plurality of optical fibers forming a ring around the elastomeric layer and the strength member; and
   a jacket defining an outer surface of the fiber optic cable.

9. The fiber optic cable of claim 8 wherein the strength member is rigid and has a diameter, and
   wherein the elastomeric layer has a thickness that is between about ten and fifty percent of the diameter.

10. The fiber optic cable of claim 8, wherein the plurality of optical fibers forming the ring contact the elastomeric layer and are tight buffered.

11. The fiber optic cable of claim 8, wherein the plurality of optical fibers forming the ring are disposed loosely in a plurality of buffer tubes that collectively encircle the elastomeric layer and the strength member.

12. The fiber optic cable of claim 8, wherein gas is disposed in openings formed in the elastomeric layer.

13. The fiber optic cable of claim 8, wherein the elastomeric layer comprises plurality of yarns coated in an elastomer, and wherein gas is disposed in openings of the elastomeric layer.

14. The fiber optic cable of claim 8, wherein the elastomer comprises silicone.

15. The fiber optic cable of claim 8, wherein the yarn is helically wrapped around the strength member.

16. A fiber optic cable comprising:
   a strength member extending lengthwise along a longitudinal axis of the fiber optic cable;
   a layer of elastomeric material adhering to and circumferentially surrounding the strength member, wherein the elastomeric material comprises gas filled cavities dispersed lengthwise along the cable;
   a plurality of buffer tubes disposed circumferentially about the strength member, each buffer tube adjacent to the layer of elastomeric material and each buffer tube containing a plurality of optical fibers; and
   an outer jacket circumferentially covering the plurality of optical fibers, the layer of elastomeric material and the strength member.

17. The fiber optic cable of claim 16, wherein each buffer tube is formed from one or more non-elastomeric materials.

18. The fiber optic cable of claim 16, wherein the layer of elastomeric material comprises at least one yarn coated in an elastomer.

19. The fiber optic cable of claim 16, wherein the layer of elastomeric material comprises two layers, each of the two layer comprising a substrate coated in an elastomer,
   wherein a first of the two layers is helically wrapped around the strength member in a clockwise direction and a second of the two layers is helically wrapped around the strength member in a counterclockwise direction.

\* \* \* \* \*